United States Patent Office 3,487,038
Patented Dec. 30, 1969

3,487,038
ELASTOMERIC SEALANT COMPOSITIONS
Leonard E. Toy, Hammond, Ind., and Robert G. Weisz, Park Forest, Ill., assignors to Standard Oil Company, Chicago, Ill., a corporation of Indiana
No Drawing. Filed June 13, 1966, Ser. No. 556,856
Int. Cl. C04b 13/30
U.S. Cl. 260—29.7      6 Claims

ABSTRACT OF THE DISCLOSURE

Aqueous mixtures of concentrated elastomer emulsions and liquid alpha-methylstyrene polymer are combined with hydraulic cements to form solidifiable cement-modified elastomeric compositions especially suitable for use as calks, sealants, or expansion joint materials.

---

This invention relates to elastomeric compositions, and particularly to novel aqueous compositions comprising rubbery elastomers and liquid alpha-methylstyrene polymers suitable for use in the manufacture of elastomeric sealant compositions. More particularly, it relates to novel sealant compositions comprising rubber elastomers, liquid alpha-methylstyrene polymer and hydraulic cement.

Elastomeric compositions are widely used in many applications. In the building construction industry, sealant compositions are used to protect curtain-wall construction, which is the formation of non-bearing walls between piers or columns for enclosure of structure but not supported at each story, from leakage problems. Sealants are extensively used for expansion joints between similar or dissimilar building materials in buildings, sidewalks and highways where expansion and contraction occurs due to temperature fluctuations. Conventional materials are usually oil-based materials which have a relatively short life prior to failure due to weathering and oxidation. There is a continuing need in the sealant industry for compositions that have improved handling and performance characteristics.

The satisfactory performance of any sealant composition depends upon its physical properties for placement, and performance after application. The material must have high adhesive properties to remain in place when applied and have high internal cohesive properties to withstand expansion and contraction forces induced by the environment in which it is placed. It must seal and yet remain plastic without losing its elasticity. It must have sufficient viscosity so that it will not sag when used in vertical and overhead locations. Resistance to atmospheric attack by water, ultraviolet light, air and ozone is an essential requirement. Another requirement is the resistance to shrinkage which results in loss of adhesion and resultant failure of the sealed joints.

Considerable interest has developed in the use of rubbery elastomers as the elastomeric material in the formation of elastomeric compositions suitable for use as sealing and calking compositions or as expansion joint materials. Attempts to make satisfactory products from aqueous rubbery elastomer emulsions have not been satisfactory due to excessive shrinkage occurring when water is evaporated.

The use of hydraulic cement as the means for converting aqueous emulsions of rubbery elastomer solids into solid elastomeric compositions is described in U.S. Patent 1,940,528 and also in Great Britain patent specification 978,234. The subject matter of both of the aforesaid patents is incorporated by reference and made a part, to the extent pertinent to the present invention, of this application. These references disclose that the addition of a hydraulic cement to an aqueous rubbery elastomer emulsion effects concurrent hydration of the cement and coagulation of the elastomer solids to form a solid cement-modified elastomeric composition suitable for many uses. The amount of cement added is less than the amount required to remove all of the water in the emulsion.

It has been found that solid elastomeric compositions, prepared in accordance with the aforesaid references, are deficient in plasticity and ultraviolet light resistance. The solid compositions thus prepared become too hard and/or have permanent tacky surfaces. Consequently, unsuitable for use as sealant compositions.

It has been discovered that the addition of liquid alpha-methylstyrene polymer to the aforesaid prior art compositions substantially improves their physical and performance properties, thus permitting the preparation of satisfactory solid elastomeric compositions. Liquid alpha-methylstyrene polymer is a low molecular weight polymeric mixture of dimers, trimers, and tetramers of alpha-methylstyrene, commercially available under the tradename "Amoco Polymer AMS-10."

A typical inspection is:

| | |
|---|---|
| Average molecular weight | 323 |
| Viscosity, SSU at 210 | 91–102 |
| Volatiles, wt. percent | 0.4 |
| Flash Point, COC° F. | 315–330 |
| Iodine No., Wijs | 5–13 |
| Dimer, wt. percent | 22–40 |

In accordance with the present invention, an improved rubbery elastomeric composition, suitable for use in the formulation of solid elastomeric compositions, is provided by a thixotropic mixture of (a) about 30–50 parts by weight of water, (b) about 50–70 parts by weight of rubbery elastomer solids, and (c) about 5–70 parts by weight of liquid alpha-methylstyrene polymer. This thixotropic mixture can then be used with from about 1 to about 3 parts by weight of hydraulic cement per part by weight of water in the mixture to form plasticized cement-modified solid elastomeric compositions. The thixotropic mixture is formed by simply mixing, with agitation, an aqueous rubbery elastomer-emulsion containing about 50–70 weight percent elastomer solids with from about 10–100 weight percent liquid alpha-methylstyrene polymer based upon the elastomer solids of the emulsion. When the thixotropic mixture is to be used in the preparation of sealant compositions, the elastomer emulsion should have a viscosity of at least 5000 centipoises.

Any rubbery elastomer of natural or synthetic origin can be used in the instant invention. Typically, these include natural rubber and synthetic rubber, such as styrene-butadiene, styrene-acrylonitrile, ethylene-propylene copolymer and terpolymer rubbers, polyisobutylene rubbers, neoprene, nitrile and butyl rubbers, and chlorobutylene rubber. It is to be understood that such rubbery elastomer emulsions may contain the usual emulsifiers and stabilizers. The emulsions should contain sufficient amount of stabilizer that is not inactivated by the polyvalent ions in the hydraulic cement so that the elastomer solids are not prematurely coagulated on mixing with the hydraulic cement.

The term "hydraulic cement," as used herein and in the claims, refers to inorganic hydratable materials, such as portland cement, gypsum, plaster of paris and calcium oxide, as well as other inert hydratable materials not reactive with the elastomer or the liquid alpha-methylstyrene polymer.

Illustrative of the trixotropic mixtures of the present invention are those produced by using a thickened aqueous butyl rubber emulsion having a viscosity of about 20,000 centipoises and containing 66% solids admixed with from 14–53 parts by weight of liquid alphamethylstyrene polymer per 100 parts by weight of the emulsion. This mixture is very high in viscosity, similar to mayonnaise, and was thixotropic.

The addition of from about 61 to about 77 parts by weight of portland cement to the aforesaid illustrative thixotropic elastomeric compositions produced sealant compositions that had a working life of from one to five hours were sag-free, did not form a tacky surface when exposed to ultraviolet light, and had a Shore A hardness ranging from 20 to 50. The cement to water ratio in the above exemplary sealant compositions was from 1.8 to 2.3.

We claim:

1. An elastomeric sealant composition consisting essentially of a mixture of (A) a thixotropic mixture of (i) an elastomer emulsion, having a viscosity of at least 5,000 centipoises, of about 50–70 parts by weight of finely divided synthetic rubber solids dispersed in about 30–50 parts by weight of water, and (ii) about 5–70 parts by weight of liquid alpha-methylstyrene polymer per 100 parts by weight of (i); and (B) from about 1 to about 3 parts by weight of hydraulic cement per part by weight of water in (A).

2. The composition of claim 1 wherein said synthetic rubber is polyisobutylene rubber.

3. The composition of claim 1 wherein said synthetic rubber is butyl rubber.

4. The composition of claim 3 wherein
   (i) contains about 64–70 parts by weight of rubber solids and about 30–36 parts by weight of water,
   (ii) is about 14–53 parts by weight, and
   (B) is from about 1.7 to 2.4 parts by weight.

5. The composition of claim 4 wherein (i) is an emulsion having a viscosity of at least 20,000 centipoises.

6. The composition of claim 5 wherein (B) is portland cement.

References Cited

UNITED STATES PATENTS

| | | |
|---|---|---|
| 2,311,233 | 2/1943 | Jaenicke et al. |
| 2,806,008 | 9/1957 | McNulty et al. |
| 3,297,617 | 1/1967 | Regenstein et al. |

OTHER REFERENCES

Boundy and Boyer, Styrene, Reinhold Publishing Corp., New York (1952), pp. 819–825.

MURRAY TILLMAN, Primary Examiner

H. ROBERTS, Assistant Examiner

U.S. Cl. X.R.

106—90, 111; 260—4, 29.6